(12) United States Patent
Misek et al.

(10) Patent No.: US 10,692,068 B2
(45) Date of Patent: Jun. 23, 2020

(54) SYSTEM AND METHOD FOR AUDIO SIGNAL MEDIATED INTERACTIONS

(71) Applicant: SOUNDPAYS INC., Toronto (CA)

(72) Inventors: Peter Misek, Oakville (CA); Jason Squire, Toronto (CA)

(73) Assignee: SOUNDPAYS INC., Toronto (CA)

( * ) Notice: Subject to any disclaimer, the term of this patent is extended or adjusted under 35 U.S.C. 154(b) by 0 days.

(21) Appl. No.: 15/753,284

(22) PCT Filed: Aug. 16, 2016

(86) PCT No.: PCT/IB2016/054903
§ 371 (c)(1),
(2) Date: Feb. 17, 2018

(87) PCT Pub. No.: WO2017/029605
PCT Pub. Date: Feb. 23, 2017

(65) Prior Publication Data
US 2018/0247297 A1  Aug. 30, 2018

Related U.S. Application Data

(60) Provisional application No. 62/207,021, filed on Aug. 19, 2015.

(51) Int. Cl.
*G06F 17/00* (2019.01)
*G06Q 20/32* (2012.01)
(Continued)

(52) U.S. Cl.
CPC ......... *G06Q 20/3272* (2013.01); *G06Q 20/12* (2013.01); *G08B 3/10* (2013.01); *H04B 11/00* (2013.01); *H04L 63/0428* (2013.01)

(58) Field of Classification Search
CPC ...... G06Q 20/3272; G06Q 20/12; G08B 3/10; H04B 11/00; H04L 63/0428
See application file for complete search history.

(56) References Cited

U.S. PATENT DOCUMENTS 7,260,221 B1  8/2007 Atsmon
8,639,619 B1  1/2014 Priebatsch
(Continued)

FOREIGN PATENT DOCUMENTS

CN  1558585 A  12/2004
CN  1928907 A  3/2007
(Continued)

OTHER PUBLICATIONS

International Preliminary Report on Patentability, dated Feb. 20, 2017, re PCT International Patent Application No. PCT/IB2016/054903.
(Continued)

*Primary Examiner* — Joseph Saunders, Jr.
(74) *Attorney, Agent, or Firm* — Perry + Currier Inc.

(57) ABSTRACT

Tokens are assigned to data to be processed. Each token is associated with a unique sound waveform defined by at least two contemporaneous tones of different frequency. The waveforms can be emitted as sound at computing devices having speakers. Other computing devices have microphones and capture emitted sound to extract tokens from the waveforms. Extracted tokens can be taken as confirmation that the data is to be processed. Data can represent transactions.

17 Claims, 7 Drawing Sheets

(51) Int. Cl.
*G08B 3/10* (2006.01)
*G06Q 20/12* (2012.01)
*H04B 11/00* (2006.01)
*H04L 29/06* (2006.01)

(56) References Cited

U.S. PATENT DOCUMENTS

| | | | |
|---|---|---|---|
| 8,935,802 B1 | 1/2015 | Mattsson et al. | |
| 2004/0102961 A1* | 5/2004 | Jensen | H04H 20/31 704/201 |
| 2007/0022058 A1 | 1/2007 | Labrou et al. | |
| 2011/0028160 A1* | 2/2011 | Roeding | G06Q 30/00 455/456.1 |
| 2012/0197806 A1 | 8/2012 | Hill | |
| 2013/0151402 A1 | 6/2013 | Howard | |
| 2013/0185214 A1 | 7/2013 | Azen et al. | |
| 2014/0108252 A1* | 4/2014 | Itwaru | G06O 20/202 705/44 |
| 2014/0172430 A1* | 6/2014 | Rutherford | G06Q 20/20 704/273 |
| 2015/0221316 A1* | 8/2015 | Mufti | G06F 16/683 700/94 |

FOREIGN PATENT DOCUMENTS

| | | |
|---|---|---|
| CN | 103942691 A | 7/2014 |
| CN | 10416995 A | 11/2014 |
| EP | 1104973 A1 | 6/2001 |

OTHER PUBLICATIONS

Written Opinion of the International Searching Authority dated Nov. 25, 2016 for PCT International Patent Application No. PCT/1B2016/054903.
International Search Report dated Nov. 25, 2016 for PCT International Patent Application No. PCT/1B2016/054903.
EPO, Extended European Search Report, dated Mar. 7, 2019, re European Patent Application No. 16836721.7.
SIPO, Second Examination Report (with English translation), dated Jan. 23, 2020, re Chinese Patent Application No. 201680054754.2.
SIPO, First Examination Report (with English translation), dated May 5, 2019, re Chinese Patent Application No. 201680054754.2.

* cited by examiner

SYSTEM AND METHOD FOR AUDIO SIGNAL MEDIATED INTERACTIONS

CROSS-REFERENCE TO RELATED APPLICATIONS

This application claims priority to U.S. 62/207,021, filed Aug. 19, 2015, the entirety of which is incorporated herein by reference.

BACKGROUND OF THE INVENTION

Field of the Invention

The present invention relates to transmitting data using sound.

Description of the Related Art

Conventional data transmission uses digital modulation techniques to transmit information using electromagnetic frequencies. A data form is translated in a digital format (e.g., ASCII) that is then transmitted through the air. This means that a carrier signal is varied to represent 0s and 1s that are sent through the air and recombined at the receiving device to reform the information that is transmitted. This has proven inordinately difficult to do with frequencies that can be produced by audio speakers and captured by audio microphones, for example frequencies in the 20 Hz to 20 kHz range. The reasons are multiple, and include: high interference rates, significant noise to signal ratios, time delays (latency) caused by packet resend, etc. For example, audio frequency based transmission technologies that digitally transmit data encounter high signal to noise ratios in environments such as a coffee shop where a simple blender being turned on can create noise and interference to render data transmission ineffective.

Accordingly, there is a continuing need for an alternative system or method for transmitting data using sound frequencies to facilitate an interaction, for example, a payment transaction.

SUMMARY OF THE INVENTION

According to one aspect of the present invention, a system for processing data includes a token server configured to assign tokens to data. The tokens are associated with sound waveforms. The token server associates each token with a unique sound waveform defined by at least two contemporaneous tones of different frequency. The token server is configured to communicate via a computer network with a service that processes data represented by the tokens. The system further includes at least one emitting computing device connected to the computer network. The emitting computing device has a speaker and is configured to emit a waveform received via the computer network as sound. The emitting computing device is further configured to communicate via the computer network with the service that processes data represented by the tokens. The system further includes at least one receiving computing device connected to the computer network. The receiving computing device has a speaker and a token extractor. The speaker is configured to capture a waveform received as sound. The token extractor is configured to extract a token from the captured waveform. The receiving computing device is configured to transmit the extracted token to the token server for the token server to identify the data represented by the extracted token, such that any identified data can be processed by the service as confirmed by the receiving computing device.

According to another aspect of the present invention, a token server is configured to assign tokens to data. The tokens are associated with sound waveforms. The token server associates each token with a unique sound waveform defined by at least two contemporaneous tones of different frequency. The token server is configured to communicate via a computer network with a service that processes data represented by the tokens. The token server is further configured to communicate with computing devices to confirm the processing of data based on tokens received from the computing devices and the matching of received tokens with data. The computing devices are configured to perform one or both of emitting waveforms as sound, and capturing waveforms and extracting tokens therefrom.

According to another aspect of the present invention, a method for processing data includes assigning a token to data to be processed, the token being associated with a unique sound waveform defined by at least two contemporaneous tones of different frequency. The method further includes initiating the transmission of the waveform to an emitting computing device via a computer network, the emitting computing device having a speaker for emitting the waveform as sound. The method further includes receiving the token from a receiving computing device via the computer network, the receiving computing device having a microphone and being configured to extract tokens from waveforms captured as sound through the microphone. The method further includes matching the captured token to the data to initiate processing of the data.

DETAILED DESCRIPTION OF PREFERRED EMBODIMENTS

With reference to the drawings an illustrative example of a system for transmitting data using sound will be described. The sound is of the kind that can be captured or received by a microphone. Data comprising numbers, letters and/or symbols, such as numerical, alphabetical or alphanumerical characters can be represented by one or more waveforms and emitted by an audio speaker housed within an emitting computing device and received by an audio microphone housed with a receiving computing device. The emission and reception of the one or more waveforms can achieve transmission of data from the first device to the second device to facilitate verification and/or interaction. In the context of commerce at physical and/or virtual (e.g., ecommerce) sites, emission and reception of the one or more sound waveforms can achieve transmission of data representing transactional information from the first device to the second device to facilitate transactions. The transmitted data may be a token or key that represents transactional information including, for example, a user's payment information. The one or more waveforms are one or more pure frequencies that are unmodulated or unprocessed to encode or embed a signal input. Thus, the one or more waveforms need not be demodulated to obtain data. Simply the presence or absence of the one or more waveforms can be sufficient to obtain the data, such as a token or key, represented by the one or more frequencies. This approach differs from existing commercially available systems that encode a digital signal within a carrier frequency by modulation of a single carrier frequency and require demodulation of the encoded frequency upon capture by a receiver.

Benefits of the present invention described herein versus existing commercially available implementations include one or more of lower latency, the ability to tolerate higher signal to noise ratios, security that could be viewed as greater than or equal to existing systems in payment transaction implementations and the capability to interact with large data sets.

Figure 1:
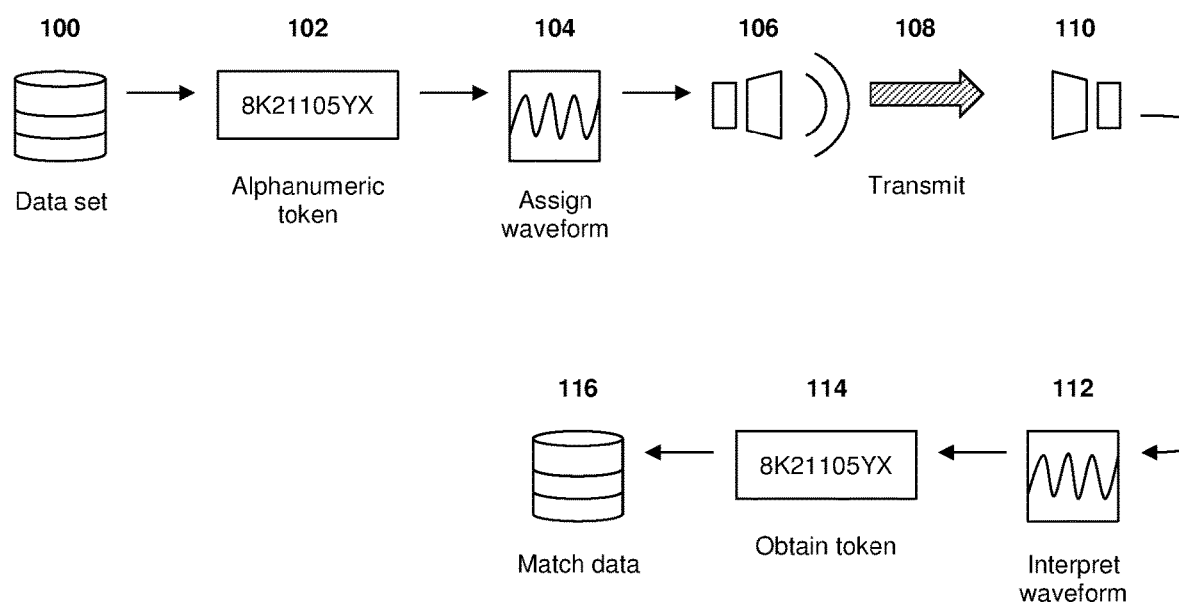
FIG. 1 is a schematic diagram of transmission of an audio signal waveform representing a unique digital token from a first computing device to a second computing device.

Now referring to the drawings, FIG. 1 shows an overview of the present invention. A system stores data in a data set 100, and data is represented by an 8-to-10-character alphanumeric key/token 102 (hereinafter token) that is assigned a unique sound waveform 104. The data represented by the token can be considered large in the sense that it is contemplated to be larger than the token in many implementations. This analog waveform is outputted by a consumer grade speaker 106 so as to transmit the waveform through the air as sound 108 to a receiving microphone 110 of a computing device. The receiving computing device then captures the sound. The token is then extracted from the waveform 112. The extracted token 114 is then used to recall the matching data 116, either on the device or at the server. The matching data 116 may be an extraction or derivation of the original data within the data set 100 or the matching data 116 may be identical to the original data. The emission of the waveform as sound and subsequent extraction of the token from the waveform can be used as confirmation that the receiving device is near the emitting device. In combination with a prompt at a user interface, this can be used to verify transactions or data transfers at the receiving device. In addition, waveforms can be embedded in broadcasted sounds, such as advertisements, entertainment, announcements, and the like to facilitate user engagement, the distribution of hyperlinks or content, and similar.

As will be discussed in detail below, the waveforms of the present invention are robust and tolerant to background noise, interference, audio file compression, fidelity loss/interference at broadcast volumes, and the like. Instead of a time-ordered sequence of tones, the present invention uses a plurality of contemporaneous tones of different frequency and amplitude. These tones can be audible, near audible, or ultrasonic. Although various suitable frequencies will be discussed below, it is contemplated that a suitable frequency range is about 16 kHz to about 22 kHz, or more specifically, about 18.5 kHz to about 20 kHz. Further, the waveform can be looped multiple times within the audio file or other media to improve the likelihood that it is captured.

An emitting computing device includes a speaker and is configured to play an audio file, or output other media, containing a waveform, so that the waveform is outputted by the speaker. The emitting computing device can obtain the audio file from a remote source, such as a server, at the time of playback or can store one or more audio files for future playback. The emitting computing device may be aware of the tokens and their association with the audio files or may be simply configured for audio output.

The receiving computing device includes an application that interprets inaudible and/or audible audio signals captured by the microphone and matches them to tokens comprising alphabetic, numeric, and/or symbolic characters. The application may be stored and run on an encrypted or unencrypted network. Versions of application may be built for major mobile operating systems, such as Apple's iOS and Google's Android, as well as Google Chrome, Microsoft Windows, and additional environments. Utilizing Application Programming Interfaces (APIs) the application can be configured to interact with services and data provided using HTML, XML, and other web-based techniques. An encrypted database can be used to store personal information and the database can be stored at one or more servers (e.g., in the cloud). The application can be written in one or more programming languages using Software Development Kit/Tools (SDKs) for the appropriate environments.

In various implementations, any computing device in the system can be one or both of an emitting computing device and a receiving computing device. That is, depending on implementation requirements, a given computing device can implement only the sound emitting functionality to output waveforms, only the sound receiving functionality to use a microphone to capture waveforms and obtain tokens therefrom, or both the emitting functionality and the receiving functionality.

Figure 2:
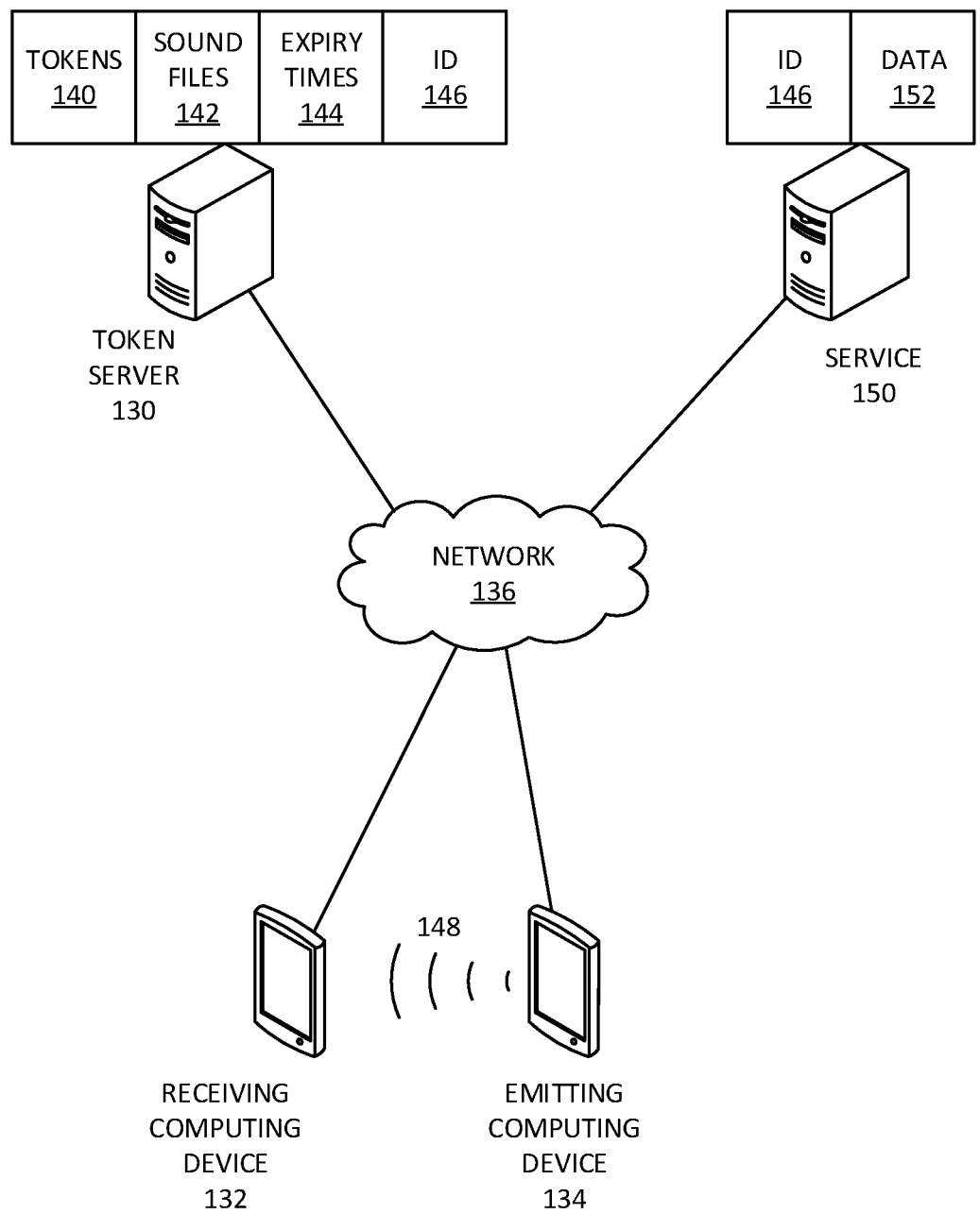
FIG. 2 is a diagram of a system for providing data interactions using sound waveforms.

FIG. 2 shows a system that includes a token server 130, at least two computing devices 132, 134, and a wide-area computer network 136 that connects the computing devices 132, 134 to the token server 130. The token server 130 stores a set of unique tokens 140 in association with a set of sound files 142 that define unique waveforms. The sound files 142 may be pre-generated based on a specific methodology described elsewhere herein, so that each sound file 142 corresponds to a different token 140. Alternatively, the sound files 142 may be generated as needed based on the methodology, which may be advantageous if there are many (e.g., millions or billions) of different tokens. A one-to-one correspondence between tokens and waveforms is enforced. A library of tokens 140 and optionally sound files 142 is thus made available. The token server 130 also stores data pertaining to the usage of the tokens 140. That is, the token server 130 stores an expiry time 144 for each token 140. The token server 130 is configured to only reuse a particular token 140 after the expiry time 144 has elapsed. The token server 130 can further store an identifier 146 for each token 140 in use, the identifier 146 pertaining to an account, transaction, user, company, device, or other unique entity or event that is presently assigned the token 140. The token server 130 includes a processor and memory to implement its functionality and may further include other components commonly provided to computer servers.

The wide-area computer network 136 can include the internet, a private network, a local-area network, a virtual private network, a wireless network, a wired network, similar computer networks, or any combination of such.

The receiving computing device 132 is configured to obtain tokens from sound 148 captured by its microphone by applying the methodology described elsewhere herein to convert a captured waveform into a token. The receiving computing device 132 is configured to transmit obtained tokens to the token server 130 via the network 136.

Examples of receiving computing devices include mobile phones, smartphones, tablet computers, desktop/laptop computers, and the like.

The emitting computing device 134 is configured to receive a sound file via the network 136 and play the sound file to output a sound to be captured by the receiving computing device 132. Examples of transmitting computing devices include mobile phones, smartphones, tablet computers, desktop/laptop computers, point-of-sale terminals, and the like.

The system further includes a service 150, such as point-of-sale service, an ecommerce service, a data/file/image storage/sharing service, a chat or instant messaging system, a media broadcast/output system, a social network, or similar. The service 150 is implemented using one or more servers connected to the wide-area computer network 136. The service 150 associates data 152 with identifiers 146, which can be associated at the token server 130 with tokens 140. Hence, between the service 150 and the token server 130, data 152 is associated with tokens 140. The service 150 is configured to process the data based on communications from the token server 130 pertaining to whether a particular token has been transmitted to an emitting device and/or whether one or more receiving devices have obtained the particular token from captured sound. In some implementations, such as financial transactions, one receiving device is expected to receive a particular waveform and token. In other implementations, such as broadcasting of media with embedded token-bearing waveforms, multiple receiving devices are expected to receive a particular waveform and token.

In a point-of-sale example, data 152 represents a transaction being processed by the service 150, which may be a merchant's computer system, a payment processing system, a payment gateway, or similar. When the transaction is to be completed, the service requests a token 140 from the token server 130 and delivers the associated sound file 142, as provided by the token server 130, to the emitting computer device 134, such as a point-of-sale terminal. The token server 130 associates the token 140 with a transaction identifier 146 received from the service 150 and sets an expiry time 144 for the token 140 for some time in the future, such as 30 seconds from the current time, which represents a timeout for the transaction. The emitting computer device 134 plays the sound file. The receiving computing device 132, such as the purchaser's mobile phone, captures the sound 148 emitted by the emitting computer device 134 and extracts the token 140 from the captured sound. The receiving computing device 132 may be triggered to listen for sound by a user command at a user interface of the receiving computing device 132. The receiving computing device 132 transmits to the token server 130 the obtained token 140 and any payment information (e.g., credit card number, PIN, etc.) stored or inputted at the receiving computing device 132. The token server 130 obtains the transaction identifier 146 using the token received from the computing device 132 and communicates the payment information for the transaction to the service 150 for completion of the transaction. Alternatively or additionally, the token server 130 or a related server can store payment information on behalf of receiving computing devices 132, so that the receiving computing devices 132 need not transmit the payment information for each transaction. Further to this point, payment information may be partially stored at the token server 130 or related server, with a receiving computing device 132 providing a completing portion of the payment information for each transaction.

Other example applications of the system include data sharing between the devices 132, 134, in which case the service is a data hosting or storage service (e.g., an image hosting service, Dropbox, etc.) and both devices are provided with sound receiving and emitting functionality. Another example is broadcasting of sound waveforms during entertainment, advertising, announcement, or other type of audio/video output. In this case, the emitting computing device is a fixed display, television set, audio output device (e.g., sound system), or similar and multiple receiving computing devices 132 can be expected to receive the sound 148.

The tokens and corresponding waveforms can be considered a library or pool that can be drawn from as needed. The expiry time sets a basic time limit before the underlying transaction, exchange, or other data processing event is considered to be completed or aborted and the token can be reused. An additional cooldown time can be provided (e.g., added to the expiry time) in scenarios where a waveform could be recorded, such as an entertainment broadcast. For example, if a waveform is broadcasted during a 1-hour TV program, the token may be held back from reuse for 1 week, so as to prevent unexpected behavior if the TV program was recorded.

Figure 3:
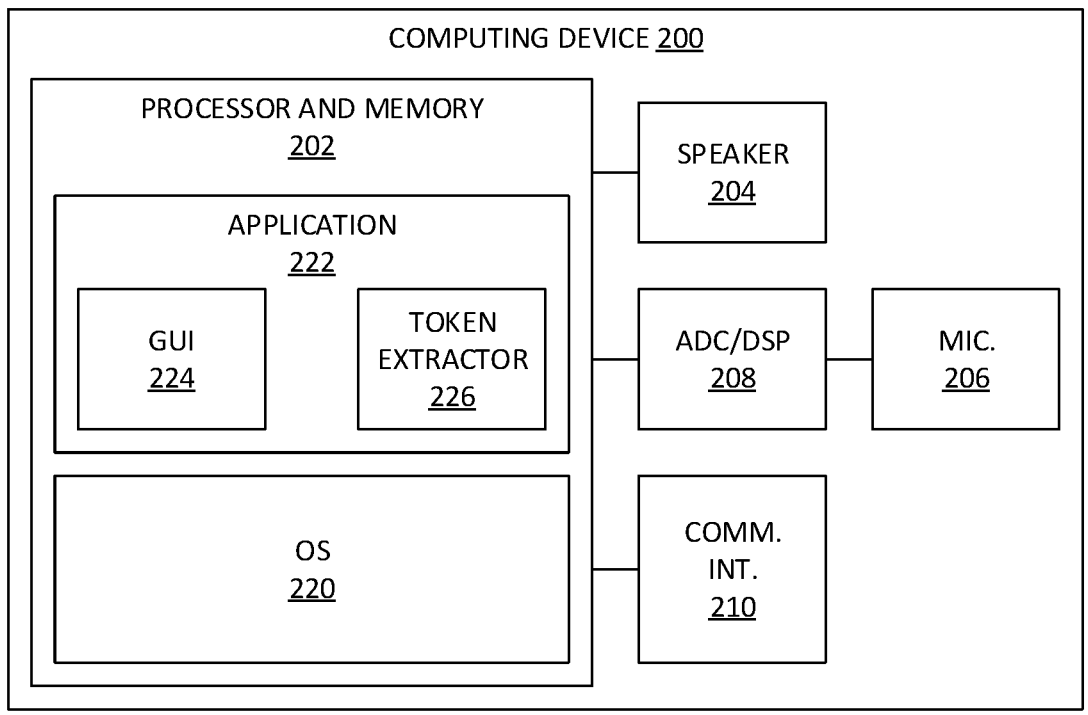
FIG. 3 is a block diagram of a computing device capable of receiving and optionally emitting sound waveforms.

In the examples discussed herein, the tokens are contemplated to be 8 to 10 characters in length. However, any suitable token length can be used in various implementations. FIG. 3 shows a block diagram of a computing device 200. The computing device 200 may be used for any of the receiving computing devices or any of the emitting and receiving computing devices discussed herein, such as the computing device 132. The computing device 200 includes, for illustrative purposes, both a speaker and a microphone, but it should be understood that a device that is only configured to receive waveforms may omit the speaker. The computing device 200 includes a processor and memory 202, a speaker 204, a microphone 206, an analog-to-digital converter (ADC) and/or digital signal processor (DSP) 208, and a communications interface 210. The computing device 200 further includes an operating system 220 and an application 222, which includes a graphical user interface (GUI) 224 and a token extractor 226. The computing device 200 can include further components, not shown for sake of brevity, such as a display device, input device, and the like.

The processor and memory 202 are configured to store and execute instructions that embody the functionality described herein, such as via the application 222 and operating system 220. The memory is further capable of storing tokens, audio files, and related data.

The speaker 204 is configured to emit waveforms as sound, as received from the application 222, another application, and/or the operating system 220.

The microphone 206 is configured to capture sound from the vicinity of the computing device 200. The ADC and/or DSP processes analog signals captured by the microphone into digital signals intelligible by the application 222 and operating system 220.

The communications interface 210 is configured to communicate data between the computing device 200 and a computer network, such as the wide-area network 136. The communications interface 210 can include any suitable port, antenna, chipset, or combination of such.

The operating system 220 is any of the operating systems discussed elsewhere herein, or similar, and manages the overall operations of the computing device 200. This can include the communications of signals between the application 222 and the speaker 204, ADC/DSP 208 and microphone 206, and communications interface 210.

The application 222 is configured to implement the functionality discussed herein for a receiving computing device, such as receiving sound waveforms, translating the waveforms into tokens, and communicating the tokens to a server or other device. The application 222 can also be configured to receive audio files from a server or other device, via the communications interface 210, and output audio files at the speaker 204, so as to behave as an emitting computing device. Playing audio files may not require significant specific programming at the application 222, as this functionality is commonly supported by the operating system 220.

The GUI 224 is configured to provide controls to the user to start listening for waveforms, stop listening for waveforms, and/or similar. The GUI 224 can further be configured to receive the input or selection of data from the user, such as payment information, personal data, and/or other data (e.g., images) that is to be shared with a service or other computing device.

The token extractor 226 is configured to extracting tokens from captured audio waveforms. This is achieved by frequency and amplitude analysis of the captured waveform and by mapping frequencies and amplitudes to an established set of characters that are used to construct tokens. As mentioned elsewhere herein, any type of mapping may be used. For example, a particular frequency at a particular amplitude may corresponded to a particular token character. Or, multiple particular frequencies at multiple particular amplitudes may corresponded to one or more particular token characters. In addition, certain frequency/amplitude combinations may be prohibited, thereby making certain character combinations invalid. Any one or combination of frequency and amplitude may correspond to any number of token characters, and a strict tone-to-character mapping is not required.

Figure 4:
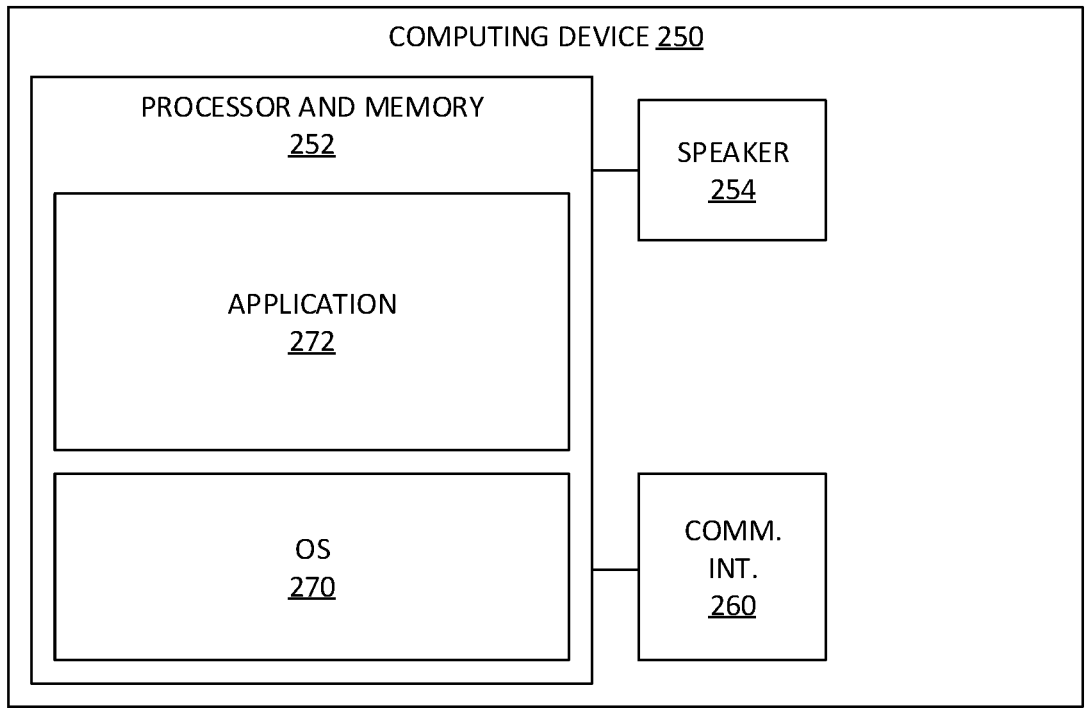
FIG. 4 is a block diagram of a computing device capable of emitting sound waveforms.

FIG. 4 shows a block diagram of a computing device 250. The computing device 250 may be used for any of the emitting computing devices discussed herein, such as the computing device 134, a point-of-sale terminal, a media playback terminal (e.g., fixed display, television set, etc.), and similar. The computing device 250 includes a processor and memory 252, a speaker 254, and a communications interface 260. The computing device 250 further includes an operating system 270 and an application 272. The computing device 250 can include further components, not shown for sake of brevity, such as a display device, input device, and the like.

The processor and memory 252 are configured to store and execute instructions that embody the functionality described herein, such as via the application 272 and operating system 250. The memory is further capable of storing audio files, other media for playback, and related data.

The speaker 254 is configured to emit waveforms as sound, as received from the application 272 and/or the operating system 270.

The communications interface 260 is configured to communicate data between the computing device 250 and a computer network, such as the wide-area network 136. The communications interface 260 can include any suitable port, antenna, chipset, or combination of such.

The operating system 270 can any of the operating systems discussed elsewhere herein, point-of-sale terminal operating systems, or similar, and manages the overall operations of the computing device 250. This can include communications of signals between the application 272 and the speaker 254 and communications interface 260.

The application 272 is configured to implement the functionality discussed herein for an emitting computing device, such as point-of-sale functionality, media playback/output functionality, and similar. The application 272 is configured to receive audio files, audio/video media, and/or other data from a service, via the communications interface 260. The application 272 is configured to output token-bearing waveforms at the speaker 254, so as to behave as an emitting computing device. The waveforms can be provided in dedicated audio files or embedded within other media being outputted (e.g., audio/video entertainment, advertisements, etc.).

Figure 5:
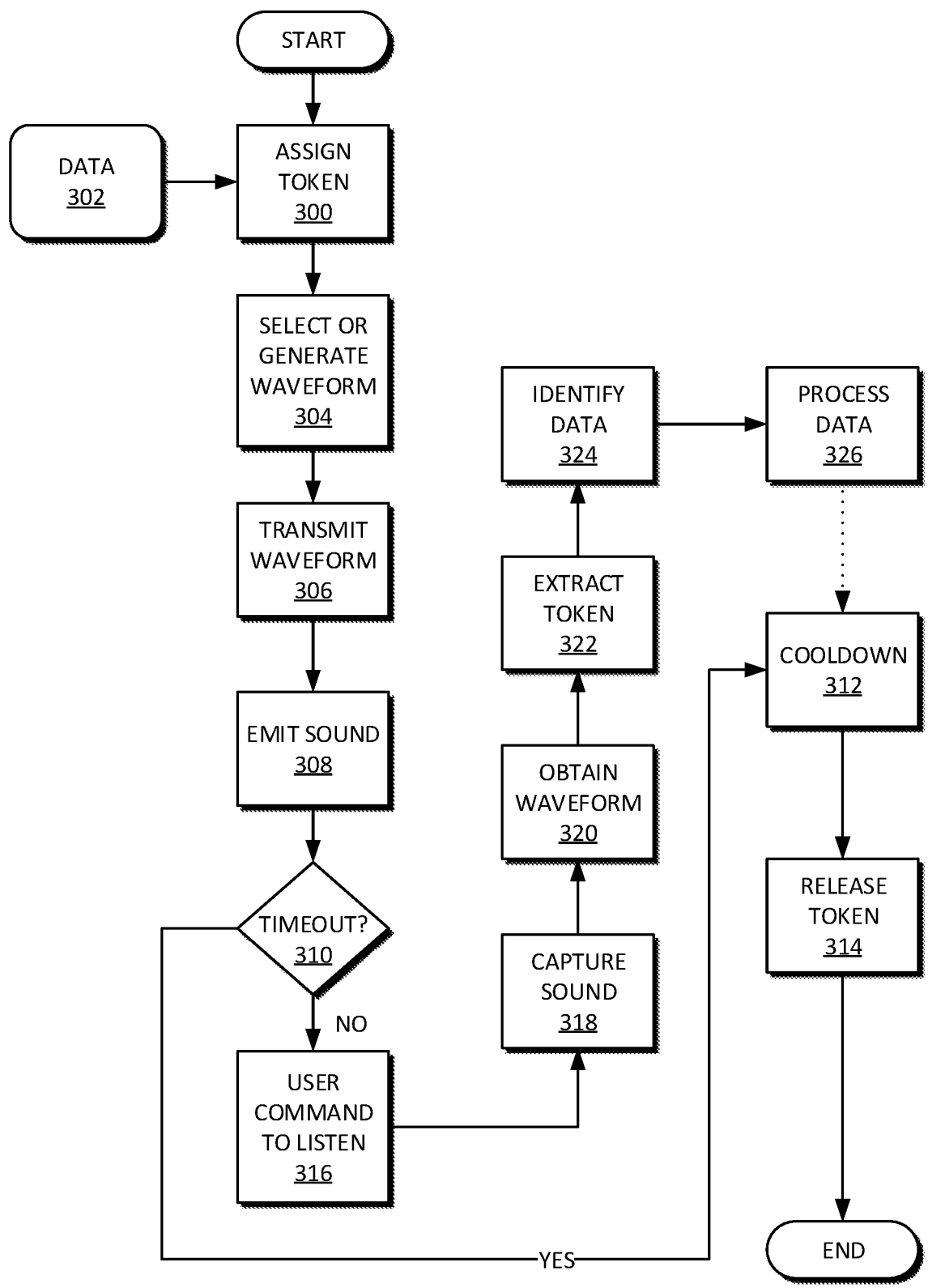
FIG. 5 is a flowchart of a method of interacting using sound waveforms.

FIG. 5 shows a method according to the present invention. The method can be performed by the system and devices discussed herein, though this is not to be taken as limiting.

A step 300, a token is assigned to data 302. This can be achieved, for example, via an intermediate identifier, which is useful if the token and data are managed by different entities. At the same time, an expiry time for the token can be set. Token assignment can take place on a server.

Next, at step 304, a sound waveform for the token is generated or selected, if pre-generated.

The waveform is transmitted, at step 306, to an emitting computing device via a computer network. The waveform may be transmitted as a separate audio file or as part of an audio or video file or stream bearing other media, such as entertainment, advertising, announcements, or the like.

At step 308, the waveform is emitted through a speaker of the emitting computing device as sound. The output of the waveform may be performed during a specific event, such as during a financial transaction to data sharing event, or may be performed on an ongoing basis, such as during a media broadcast. The waveform can be temporally looped (repeated) over a duration.

The waveform is emitted until a timeout is reached, at step 310, at which point the token can held back from reuse for a cooldown period, at step 312 before being released for reuse, at step 314. Timeout duration and cooldown period equate to the expiry time, and these values can be stored and tracked in various ways. Generally, the timeout is the time that the token can be acted on and the cooldown is the time before which the token can be reused.

At step 318, while the waveform sound is being emitted, a receiving computing device captures sound via its microphone. This can be in response to a user command at the receiving computing to enable the listening functionality, at step 316.

At step 320, captured sound is analyzed for waveforms indicative of tokens and any such tokens are extracted from the waveform, at step 322. This can be achieved by frequency/amplitude analysis performed at the receiving computing device. Alternatively, the captured waveform can be transmitted as data from the receiving computing device to a server for analysis at the server.

Next, the data 302 represented by the token is identified, at step 324. This can include the receiving computing device transmitting the token to the server that originally assigned the token. The correlation of token to data identifies the data, whether directly or via an intermediate identifier.

The data is then processed, at step 326. The type of processing depends on the implementation and processing can be performed by the same server that manages the tokens, by a different server, or by a separate service. Examples of processing are discussed elsewhere herein, and include the completion of financial transactions, the sharing of data, the communication of content or links to content, and similar.

For multi-use tokens, that is, tokens expected to be used by multiple receiving devices (or by the same device more than once), the method proceeds to cooldown and release only after the timeout at step 310. This can also be done for single-use tokens, such as those used to complete financial transactions. Alternatively, for single-use tokens, actual use of the token can be used to trigger cooldown and release (i.e., the dashed arrow between steps 326 and 312). In still a further alternative, multi-use tokens can be deactivated after a certain number of uses by one or more receiving devices, which can be tracked by the server or service and can trigger the method to proceed from step 326 to the cooldown and release steps 312, 314.

It is worth noting that, in the method, no digital handshake is necessary. Rather, capture of the waveform by the receiving computing device using a microphone is utilized to confirm that the data is to be processed.

Figure 6:
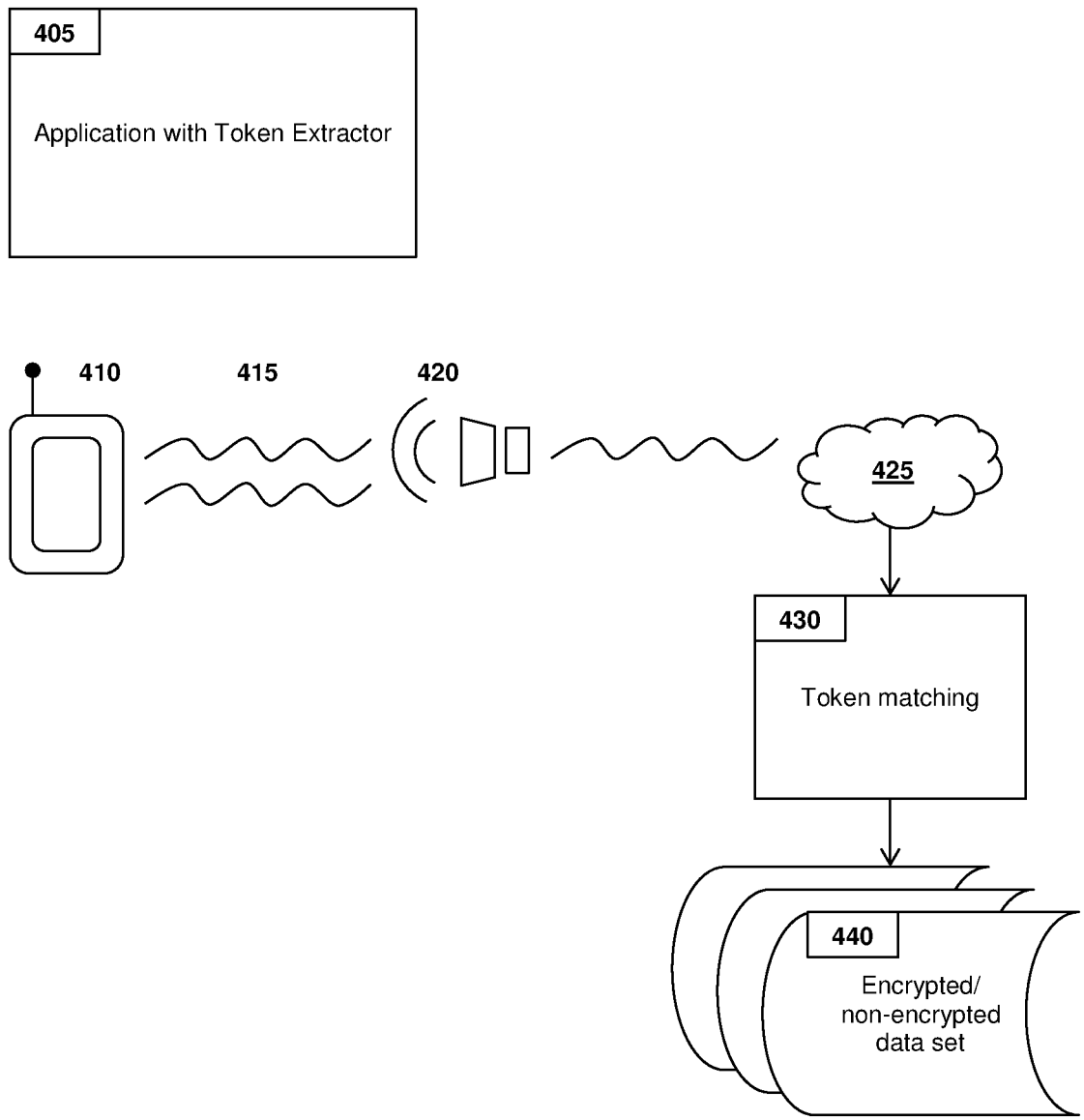
FIG. 6 is a schematic diagram of a use of the system.

FIG. 6 illustrates use of the system to facilitate an interaction between two electronic devices. In FIG. 6, a conventional consumer electronics device, in this case a smartphone 410, is used to pay and/or interact with an Internet connected device that has a speaker 420, which emits a waveform 415 as sound. The speaker 420 can be part of any type of audio or video device, such as a fixed display, television set, etc. The waveform is created by the system which stores data or an identifier of data that is assigned a token which in turn is assigned the corresponding waveform. The waveform is received by the smartphone's microphone and is recognized using an application 405 that extracts the token from the waveform. Once the waveform's token is obtained, the token is transmitted to a server via a computer network 425. The server matches 430 the token to the data 440 previously assigned to the token, so that the data can be processed.

Figure 7:
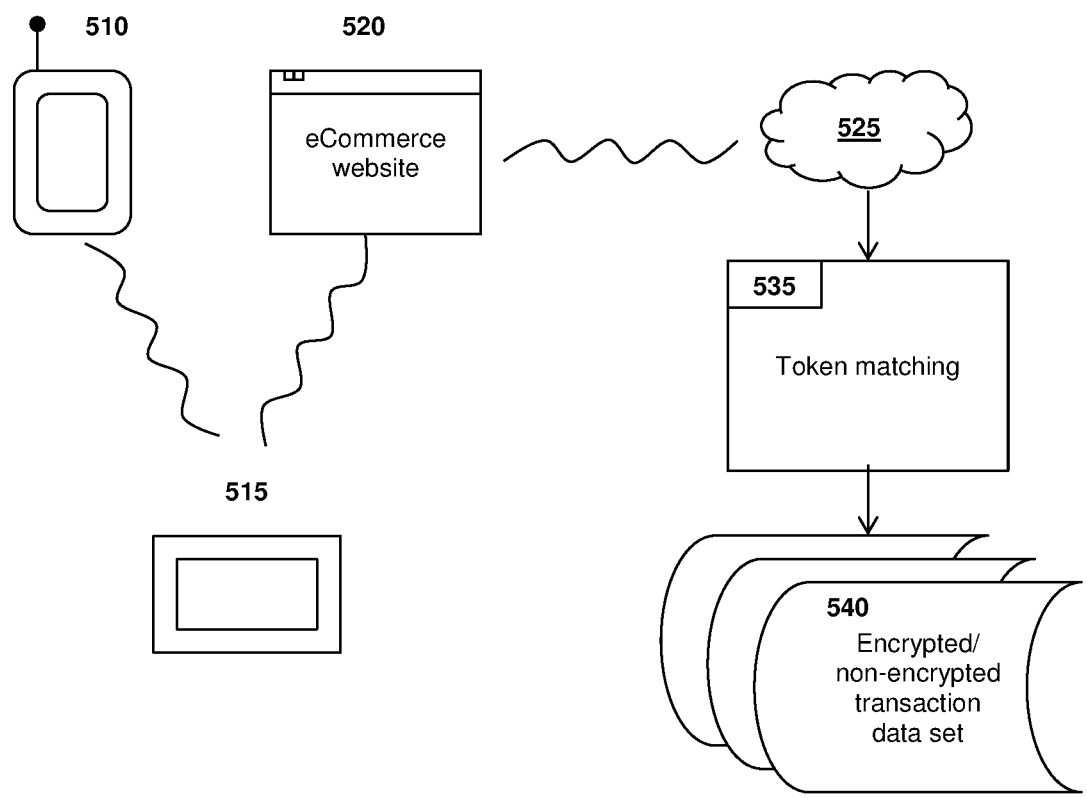
FIG. 7 is a schematic diagram of an ecommerce use of the system.

FIG. 7 illustrates a use of the system to facilitate a customer/merchant interaction in a virtual commerce platform. FIG. 5 relates to ecommerce. In this example a user operates a desktop/laptop computer and a smartphone 510. The user visits a website with the computer and selects items to add into a shopping cart. Once added, the user activates a graphical user interface button on the smartphone 510 which activates a software application. The desktop/laptop computer then emits a waveform 515 to the smartphone 510 which is used to interact with the waveform, as discussed elsewhere herein. The waveform is created by the system which stores transaction data or an identifier of transaction data that is assigned a token which in turn is assigned the waveform. The waveform is transmitted via a computer network 525 to the speaker on the desktop/laptop computer, which then emits the waveform as sound. The waveform is received by the smartphone's microphone and is recognized using an application that extracts the token from the waveform. Once the waveform's token is obtained, the token is transmitted to a server via the computer network 525. The server matches 535 the token to the transaction data 540 previously assigned to the token, so that the transaction can be processed.

Figure 8:
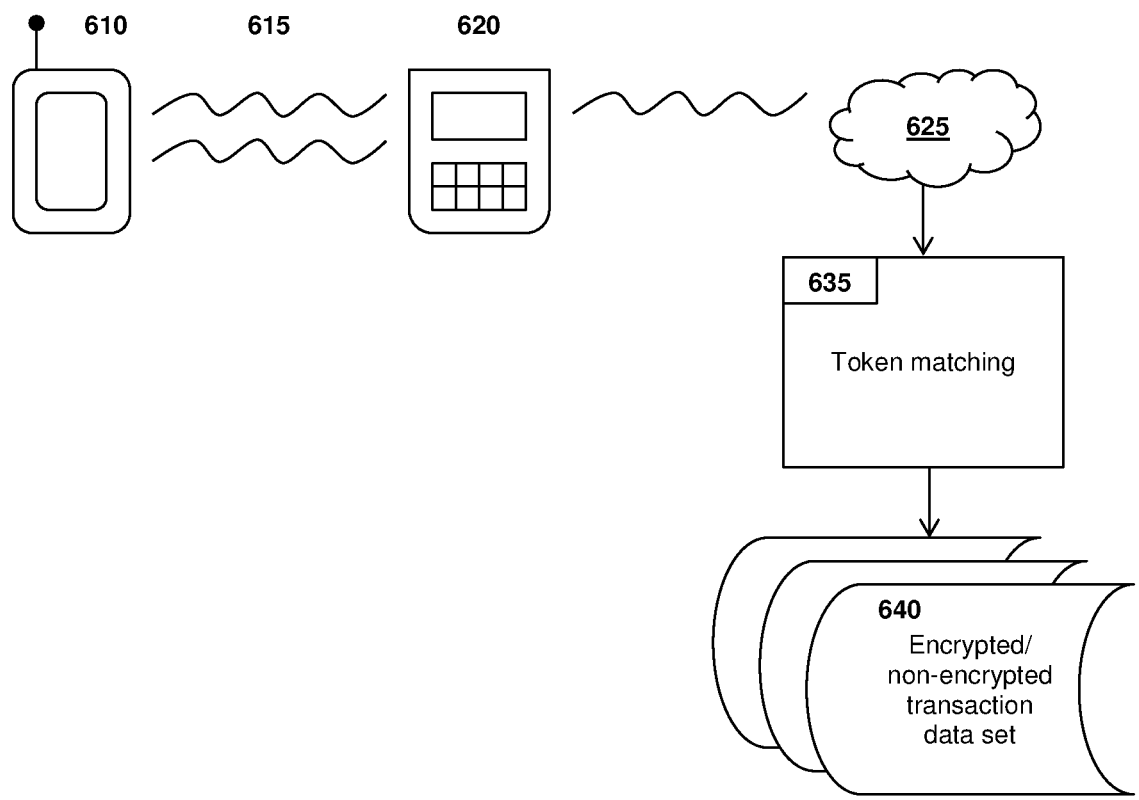
FIG. 8 is a schematic diagram of the system used at point of sale.

FIG. 8 illustrates a use of the system to facilitate a customer/merchant interaction in a physical point-of-sale site. FIG. 8 relates to a transaction at a point-of-sale device at a physical location. In this example, the user has a smartphone 610. The user visits a merchant's physical retail location having a point-of-sale payment terminal device 620. After the user's purchase is rung up by the cashier, the point-of-sale terminal emits a waveform 615 to the smartphone 610. The waveform is one of many created by the system and associated with various tokens, which are associated with various transactions being processed. The waveform is transmitted via a computer network 625 to the point-of-sale terminal, which then emits the waveform as sound via its speaker. The waveform is received by the user's smartphone microphone and is recognized using an application that extracts the token from the waveform. Once the waveform's token is obtained, the token is transmitted to a server via the computer network 525. The server matches 635 the token to the transaction data 640 previously assigned to the token, so that the transaction can be processed. Payment information may be sent from the smartphone to the system at the same time.

A waveform is a unique audio-based signal that can be transmitted using various digital techniques including but not limited to audio files such as MP4, MP3, WAV files and similar digital techniques. A waveform is a graphic representation of the shape of a wave that indicates its characteristics (such as frequency vs amplitude or time vs amplitude).

The waveform comprises a plurality of unique unmodulated pure frequencies that can be emitted by a conventional consumer grade speaker and captured by a conventional consumer grade microphone. Since the unique frequencies are unmodulated, the transmitted waveform is devoid of modulated frequency sidebands which accompany some modulation schemes.

Since frequencies are emitted without modulation the frequency bandwidth is narrow and channels to capture and recognize frequencies can be correspondingly narrow, such as less than 20 Hz or even less than 10 Hz.

To create an extremely reliable and robust method to transmit data within the audio frequency range of 20 Hz to 25 kHz, frequency channels are configured with a difference of 10 Hz for recognition and pattern matching within this frequency range. An effective differential for frequency channels based on testing is 1 Hz within soundless environments. However, in practical implementation to ensure quicker and more robust recognition a suitable implementation has a minimum of 2 Hz channel deviation and 5 to 10 Hz channels are used due to signal noise challenges. Range can exceed 10 Hz channels however possible combinations of tokens that represent data would be reduced. Channels of less than 1 Hz may be used in environments with little to no signal to noise.

Channels can also be configured to have a dimension of amplitude. In noisy environments, channels are not distinguished based on an amplitude dimension and are kept constant, distinguishing channels based on frequency for robust and reliable waveform recognition. However, in environments with low background noise or interference and/or using higher performance audio equipment and mixing equipment, amplitude channels of 3 to 5 dB can be utilized to create additional tokens for large data sets. Channels of 3 dB or less can be used in environments with little to no noise or interference.

In the system described, time based channels require a minimum of 50 millisecond intervals in environments with low background noise or interference. In normal environments, 100 millisecond intervals are utilized to ensure robust and reliable recognition. Intervals of greater than 100 milliseconds can be deployed but tokens available to assign would be reduced. Channels of less than 50 milliseconds can be used with large computing power and/or environments with little to no noise or interference.

Thus, in environments with little or no background noise, amplitude and/or time can be incorporated as distinguishing dimensions for each channel, achieving a three-dimensional channel having dimensions of frequency, amplitude and time.

In order to improve security and reliability, audio markers to pre-empt identification of waveforms can be transmitted before transmission of the waveform. Audio markers can create access and security levels for use in environments where time to recognize is less of an issue and security takes on a higher priority.

Unique waveforms represent unique tokens. The unique token can be any unique identifier comprising any unique combination of letters, numbers, or symbols. Many tokenization schemes are currently in practice, and any existing tokenization scheme may be accommodated and adapted to fit the system. Tokenization may be used to safeguard sensitive data involving, for example, bank accounts, financial statements, medical records, criminal records, driver's licenses, loan applications, stock trades, voter registrations, and other types of personally identifiable information (PII). Tokenization is often used in credit card processing. For data security, tokenization substitutes a sensitive data element with a non-sensitive equivalent or surrogate, referred to as a token, that has no extrinsic or exploitable meaning or value. The token is a reference (i.e., an identifier) that maps back to the sensitive data through a tokenization system. The mapping from original data to a surrogate token uses methods which render tokens infeasible to reverse in the absence of the tokenization system, for example using tokens created from random numbers. In order to create a token sample size large enough for most implementations a minimum of two frequencies are used and result in a minimum token population of 2,556. Whereas a single frequency would result in 72 possible tokens. A three frequency channel system produces 59,640 tokens and a four frequency channel system produces 1,028,790 tokens. This token system assumes a simultaneous time based broadcast with amplitude that is identical. Adding those other two dimensions can exponentially increase the token sample size but would create potential issues on the robustness and reliability of the system. Therefore at least two frequencies are used to create a minimum token and waveform library. It is contemplated that two to four frequencies can be used. Greater than four frequencies can be used but the time to transmit, recognize and return the data set would be longer, and therefore the number of unique frequencies used would be adjusted depending on time sensitivity of a specific implementation.

To implement a library or pool of tokens and waveforms according to some embodiments, each token corresponds to one unique waveform. Waveforms may be stored as sound files. Each waveform is constructed from at least two frequencies of specific amplitudes that overlap in time. Time-domain encoding is not used. That is, characters of the token are not mapped to a time-ordered sequence of different sounds. Instead, tones of various frequency and amplitude are coincident, thereby creating a sound "picture" that represents the token. Tokens can be readily extracted from such waveforms using frequency and amplitude analysis. A waveform can be looped in the audio file to improve the chance that at least one full length of the waveform is captured by a receiving device. Moreover, this can be used for error correction, in that a receiving computing device can be configured to attempt to capture as many waveforms as possible and discard those that do not agree with a majority.

Tokens and waveform-bearing audio files may be generated ahead of time and stored in a server for use, as needed. Alternatively, tokens and/or waveform-bearing audio files may be generated as needed, and may be discarded after use.

Various methodologies may be used to convert tokens into waveforms and vice versa. That is, each character of a set of characters of a token may correspond to an elemental monotonic waveform having a particular frequency and particular amplitude. When a token is made, the associated elemental waveforms are overlapped in time. Further, various rules can be implemented to maintain intelligibility of the final waveform and improve tolerance to noise. For instance, certain token character combinations can be prohibited. Further, for example, a token character may have several possible elemental waveforms, from which one is selected depending on the other characters present in the token.

The unique frequencies used to compose an audio signal are selected from a set of predetermined frequencies with predetermined frequency separation in a pre-set frequency range. It is contemplated that the unique frequencies are selected from a group of at least 20 different predetermined frequencies separated by at least 5 Hz in a range from 1 Hz to 60 kHz. A further suitable frequency range is about 16 kHz to about 22 kHz, and still further, about 18.5 kHz to about 20 kHz. The number, frequency separation and overall frequency range can all be varied to suit a desired implementation. For example, the number of predetermined frequencies may be greater than 75, 100, 125, 150, 175, 200, 225, 250, 275, 300 or greater than any number therebetween. It is contemplated that at least one parameter of the predetermined frequencies is held constant from a first time point associated with mapping or linking a waveform to data to a second time point associated with transmitting the audio signal. For example, the frequency separation of the predetermined frequencies may be held constant from a time of generating the token to a time of transmitting the audio signal. In another example, the number of the predetermined frequencies may be held constant from a time of generating the token to a time of transmitting the audio signal. In yet another example, both the number and the frequency separation of the predetermined frequencies may be held constant from a time of generating the token to a time of transmitting the audio signal.

Predetermined channels are used to determine which channel encompasses each of the unique frequencies included within a captured audio signal. Predetermined channels may be selected from a set of a predetermined number of frequency channels, each channel having a predetermined frequency width and bound by predetermined limits that encompass a single one of the predetermined unique frequencies. Typically, the frequency channels are selected from a group of at least 20 predetermined frequency channels, each channel having a frequency width of at least 5 Hz and bound by limits that encompass a single one of the 20 predetermined unique frequencies. The number, frequency width and overall frequency range can all be varied to suit a desired implementation. For example, the number of predetermined frequency channels may be greater than 25, 50, 75, 100, 125, 150, 175, 200, 225, 250, 275, 300 or greater than any number therebetween. It is contemplated that the number of predetermined frequency channels will be equal to or greater than the number of predetermined unique frequencies. It is contemplated that at least one parameter of the predetermined frequency channels is held constant from a first time point associated with mapping or linking a waveform to data to a second time point associated with transmitting the audio signal. For example, the frequency width of the predetermined frequency channels may be held constant from a time of generating the token to a time of transmitting the audio signal. In another example, the number of the predetermined frequency channels may be held constant from a time of generating the token to a time of transmitting the audio signal. In yet another example, both the number and the frequency width of the predetermined frequency channels may be held constant from a time of generating the token to a time of transmitting the audio signal.

Where suitable, for example with respect to lower background noise or interference, similar considerations for amplitude and/or time dimensions may be applied as used to establish parameters of predetermined unique frequencies and predetermined frequency channels.

The system may be used to represent any type of personal data with a token and a corresponding waveform. Examples of personal data include, but are not limited to, mailing address, billing information, credit card information, debit card information, password, social security number, birth date, mother's maiden name, and the like.

It will be recognized that a user may take advantage of the system without a computing device, for example, any device that has a capability to produce an audio signal encoding the user's personal data. One example of a user device that is not a computing device is a credit card that comprises an audio signal transmitter.

Audio signals are audible and inaudible sound frequencies in the 1 Hz to 60 kHz range. In certain examples, the audio signal has a frequency that is less than 55 kHz, 50 kHz, 45 kHz, 40 kHz, 35 kHz, 30 kHz, 25 kHz, 20 kHz or less than any frequency therebetween. In certain examples, the audio signal comprises has a frequency that is greater than 2 Hz, 4 Hz, 6 Hz, 8 Hz, 10 Hz, 12 Hz, 14 Hz, 16 Hz, 18 Hz, 20 Hz, 22 Hz, 24 Hz, 26 Hz, 28 Hz, 30 Hz or greater than any frequency therebetween.

Many conventional speakers and microphones are able to transmit and capture/receive sound frequencies within the 1 Hz to 40 kHz range. These speakers and microphones are found within typical consumer electronics products. These sound frequencies can be generated by these speakers for the transmission of tokens representative of data. Further, these sound frequencies can be captured by microphones for the reception of tokens representative of data.

The system may accommodate many different backend server configurations depending on the desired implementation of the system. For, example, a backend server can provide authorization via a transaction or payment processor, such as Visa, MasterCard, and American Express. Confirmation is then sent to the merchant and customer to complete the transaction. In another example, a backend server may provide decoding of sound files that have been recorded by a computing device and sent to the backend server for decoding.

Further examples of the invention are also contemplated. The user's computing device can be configured to record the captured waveform with the remaining processing occurring on a server or by a service. In another example, all processing occurs on the user's computing device, including token matching, which can be used to implement gift cards and similar applications. In other examples, processing can be performed at the service referencing stored values for an individual customer based on among other things credit history, purchasing patterns, or other loan values. Further, audio signal emission and capture can be in the direction from a merchant's point-of-sale device to the user's computing device, as described elsewhere herein, or alternatively sound waveforms can be emitted by the user's computing device and captured by the point-of-sale terminal. Bidirectional sound waveform communication is also possible.

Many different types of algorithms may be incorporated in computer programmable code to perform different functions within the system including, for example, functions of encoding audio signals with embedded personal data, decoding the audio signals, encryption of personal data, decryption of personal data, and the like.

Encryption/decryption can be used in various implementations and can include various methods and standards of encryption including but not limited to AES, DES, triple DES, hashing, ECC etc.

The system can accommodate any type of network configuration. For example, a network may include so-called cloud based computing systems where processing power, storage, and networking are accessed via the Internet and utilize third party systems such as but not limited to Amazon Web Services.

The network may be a single network or a combination of multiple networks. For example, the network may include the internet and/or one or more intranets, wired networks, wireless networks, and/or other appropriate types of communication networks. In many examples, the network may comprise a wireless telecommunications network (e.g., cellular phone network) adapted to communicate with other communication networks, such as the internet. The network may comprise a computer network that makes use of a TCP/IP protocol (including protocols based on TCP/IP protocol, such as HTTP, HTTPS or FTP).

The system may be adapted to follow any computer communication standard including Extensible Markup Language (XML), Hypertext Transfer Protocol (HTTP), Java Message Service (JMS), Simple Object Access Protocol (SOAP), Representational State Transfer (REST), Lightweight Directory Access Protocol (LDAP), Simple Mail Transfer Protocol (SMTP) and the like.

The system described herein and each variant, modification or combination thereof may also be implemented as a method or code on a computer-readable medium. The computer-readable medium is a tangible data storage device that can store data, which can thereafter, be read by a computer system. Examples of a computer readable medium include read-only memory, random-access memory, CD-ROMs, magnetic tape, optical data storage devices and the like. The computer readable medium may be geographically localized or may be distributed over a network coupled computer system so that the computer readable code is stored and executed in a distributed fashion.

Embodiments described herein are intended for illustrative purposes without any intended loss of generality. Still further variants, modifications or combinations thereof are contemplated and will be recognized by the person of skill in the art. Accordingly, the foregoing detailed description is not intended to limit scope, applicability, or configuration of claimed subject matter.

We claim:

1. A system for processing data, the system comprising:
a token server configured to assign tokens to data, and, responsive to assigning the tokens to data, set expiry times for the tokens, the tokens being associated with sound waveforms, the token server associating each token with a unique sound waveform defined by at least two contemporaneous tones of different frequency, the token server configured to communicate via a computer network with a service that processes data represented by the tokens;

at least one emitting computing device connected to the computer network, the emitting computing device having a speaker and configured to obtain, via the computer network, a sound file containing the waveform, the waveform being looped within the sound file, and emit the waveform as sound, the emitting computing device further configured to communicate via the computer network with the service that processes data represented by the tokens; and at least one receiving computing device connected to the computer network, the receiving computing device having a microphone and a token extractor, the microphone configured to capture a waveform received as sound, the token extractor configured to extract a token from the captured waveform, the receiving computing device configured to transmit the extracted token to the token server for the token server to identify the data represented by the extracted token, such that any identified data can be processed by the service as confirmed by the receiving computing device; and wherein the token server is further configured to, in response to exceeding an expiry time set for the extracted token, release the extracted token for reuse.

2. The system of claim 1, wherein frequencies of the waveforms are selected from least 20 different predetermined frequencies separated by at least 5 Hz.

3. The system of claim 2, wherein the receiving computing device is configured to identify a channel encompassing each different frequency of each waveform, the channel selected from a group of at least 20 predetermined channels, each predetermined channel having a frequency width of at least 5 Hz and bound by limits that encompass a single one of the at least 20 predetermined frequencies.

4. The system of claim 3, wherein a frequency width of the at least 20 predetermined channels is held constant.

5. The system of claim 3, wherein a number of the at least 20 predetermined channels is held constant.

6. The system of claim 5, wherein the frequency separation of the at least 20 predetermined frequencies is held constant.

7. The system of claim 5, wherein a number of the at least 20 predetermined frequencies is held constant.

8. The system of claim 7, wherein the emitting computer device is a merchant computing device or point-of-sale terminal, the receiving computing device is a purchaser's computing device, and the data represents a transaction for a good or a service.

9. The system of claim 8, wherein the at least two contemporaneous tones of different frequency are unmodulated pure frequencies.

10. The system of claim 9, wherein each waveform is devoid of modulated frequency sidebands.

11. The system of claim 10, wherein the at least two contemporaneous tones of different frequency comprise at least two frequencies in a frequency range of 16 kHz to 22 kHz.

12. The system of claim 10, wherein the at least two contemporaneous tones of different frequency comprise at least two frequencies in a frequency range of 18.5 kHz to 20 kHz.

13. The system of claim 12, wherein the waveform is transmitted to the emitting computing device within other audio/visual media.

14. The system of claim 12, wherein the token server stores pre-generated sound files containing the waveforms.

15. A token server configured to assign tokens to data, the tokens being associated with sound waveforms, the token server, responsive to assigning the tokens to data, setting expiry times for the tokens, and associating each token with a unique sound waveform defined by at least two contemporaneous tones of different frequency, the token server configured to communicate via a computer network with a service that processes data represented by the tokens and to transmit a sound file containing the wave form, the waveform being looped within the sound file, to computing devices, the token server further configured to communicate with the computing devices to confirm processing of data based on tokens received from the computing devices and matching of received tokens with data, the computing devices configured to perform one or both of emitting waveforms as sound, and capturing waveforms and extracting tokens therefrom, the token server further, in response to exceeding respective expiry times set for the extracted tokens, releasing the extracted tokens for reuse.

16. A method for processing data, the method comprising:
assigning a token to data to be processed, the token being associated with a unique sound waveform defined by at least two contemporaneous tones of different frequency;
responsive to assigning the token to data, setting an expiry time for the token;
initiating transmission of a sound file containing the waveform, the waveform being looped within the sound file, to an emitting computing device via a computer network, the emitting computing device having a speaker for emitting the waveform as sound;
receiving the token from a receiving computing device via the computer network, the receiving computing device having a microphone and being configured to extract tokens from waveforms captured as sound through the microphone;
matching the captured token to the data to initiate processing of the data; and
in response to exceeding the expiry time for the captured token, release the captured token.

17. The method of claim 16, further comprising capturing the waveform using the microphone of the receiving computing device and extracting the token from the captured waveform.

\* \* \* \* \*